United States Patent
Korus et al.

(10) Patent No.: US 8,672,064 B2
(45) Date of Patent: Mar. 18, 2014

(54) APPARATUS FOR CONVERTING A WHEELED VEHICLE TO A TRACKED VEHICLE

(75) Inventors: Thomas J. Korus, Lindsay, NE (US); Ronald S. Hansen, Kindred, ND (US)

(73) Assignee: Loegering Mfg. Inc., Casselton, ND (US)

( * ) Notice: Subject to any disclaimer, the term of this patent is extended or adjusted under 35 U.S.C. 154(b) by 497 days.

(21) Appl. No.: 12/676,981

(22) PCT Filed: Sep. 5, 2008

(86) PCT No.: PCT/US2008/075442
§ 371 (c)(1),
(2), (4) Date: Dec. 27, 2010

(87) PCT Pub. No.: WO2009/033052
PCT Pub. Date: Mar. 12, 2009

(65) Prior Publication Data
US 2011/0101135 A1    May 5, 2011

Related U.S. Application Data

(60) Provisional application No. 60/970,764, filed on Sep. 7, 2007.

(51) Int. Cl.
*B62D 55/04* (2006.01)
(52) U.S. Cl.
USPC .......................................... 180/9.26; 180/9.3
(58) Field of Classification Search
USPC ................................................ 180/9.26, 9.3
See application file for complete search history.

(56) References Cited

U.S. PATENT DOCUMENTS 3,165,364 A  1/1965 Hardman et al.
3,682,266 A  8/1972 Stoliker
(Continued)

FOREIGN PATENT DOCUMENTS

WO    WO 02/01007 A1    2/2002

*Primary Examiner* — Joseph M Rocca
*Assistant Examiner* — Michael Stabley
(74) *Attorney, Agent, or Firm* — Moore & Hansen, PLLC

(57) ABSTRACT

The invention relates to a self-propelled, wheeled irrigation vehicles (10) that may be converted into a multi-track self-propelled irrigation vehicle (60) using one or more track assemblies (62). Each track assembly (62) includes a carriage (70) with frames (92, 94) that support a plurality of pairs of idler wheels (74, 76), and pairs of bogey wheels (80, 82, 84). A portion of one of the frames (94) is telescopically received within a portion of the other frame (92), so that the frames (92, 94) may move relative to each other in a linear fashion. A tensioning apparatus (212) is connected to the frames (92, 94) so that the frames are adjustable relative to each other. Each carriage (70) also includes a hub support frame (90) that is connected to one of the frames (92) in an offset manner. The hub support frame (90) includes an aperture (132) that rotatably receives a spindle (262) of an adaptor (258). The adaptor (258) includes a peripheral flange (264) to which a segmented sprocket (86) may be connected, and a ring extension (268) that is able to be connected to an existing wheel hub of an irrigation vehicle whose drive wheel has been removed. A flexible endless track (88) is entrained about the wheels (74, 76, 80, 82, 84) and the sprocket (86). The track assembly (62) may be provided with one or more cleats (278) that are removably connected to the flexible, endless track (88), and which include a ground engaging member (281) that serves to increase the traction of the endless track (88).

35 Claims, 10 Drawing Sheets

(56) References Cited

U.S. PATENT DOCUMENTS

| | | | |
|---|---|---|---|
| 4,109,971 A | 8/1978 | Black et al. | |
| 4,448,273 A * | 5/1984 | Barbieri | 180/9.21 |
| 5,388,656 A * | 2/1995 | Lagasse | 180/9.21 |
| 5,829,848 A * | 11/1998 | Kelderman | 305/15 |
| 6,408,965 B1 | 6/2002 | Grant | |
| 6,543,862 B1 * | 4/2003 | Kahle et al. | 305/195 |
| 6,615,939 B1 | 9/2003 | Karales et al. | |
| 6,805,311 B2 | 10/2004 | Buller | |
| 6,981,563 B2 * | 1/2006 | Phely et al. | 180/9.21 |
| 7,111,697 B2 | 9/2006 | Brazier | |
| 7,255,184 B2 * | 8/2007 | Loegering et al. | 180/9.26 |
| 7,597,161 B2 * | 10/2009 | Brazier | 180/9.3 |
| 2002/0179343 A1 | 12/2002 | Theilen | |
| 2004/0017109 A1 | 1/2004 | Deland et al. | |
| 2005/0145422 A1 | 7/2005 | Loegering et al. | |
| 2007/0131806 A1 | 6/2007 | Starr | |

* cited by examiner

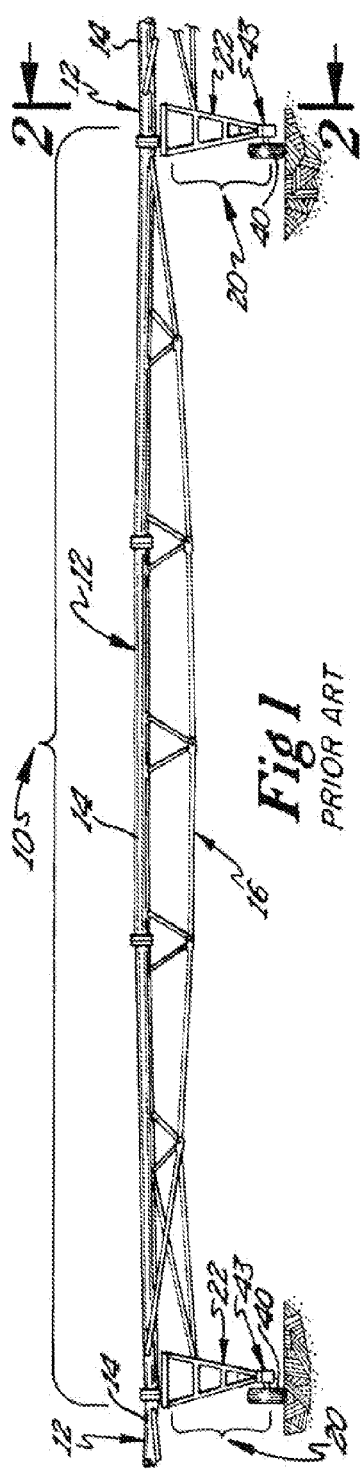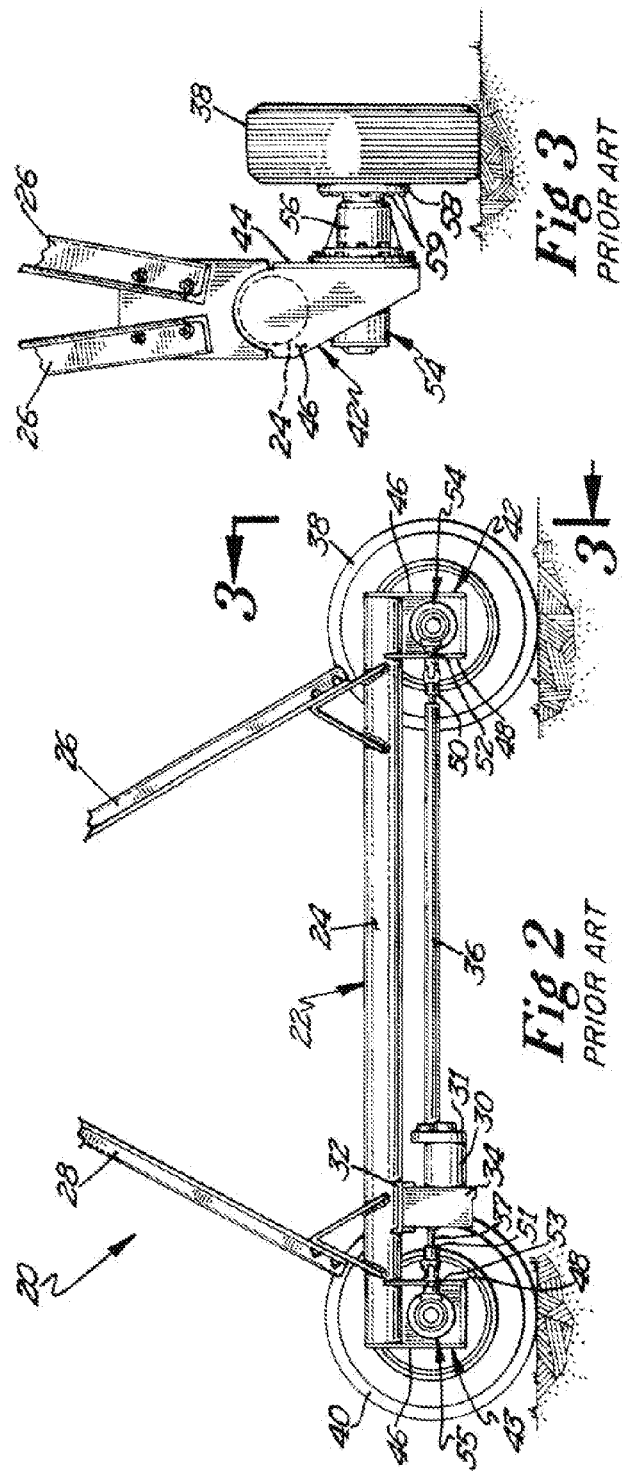

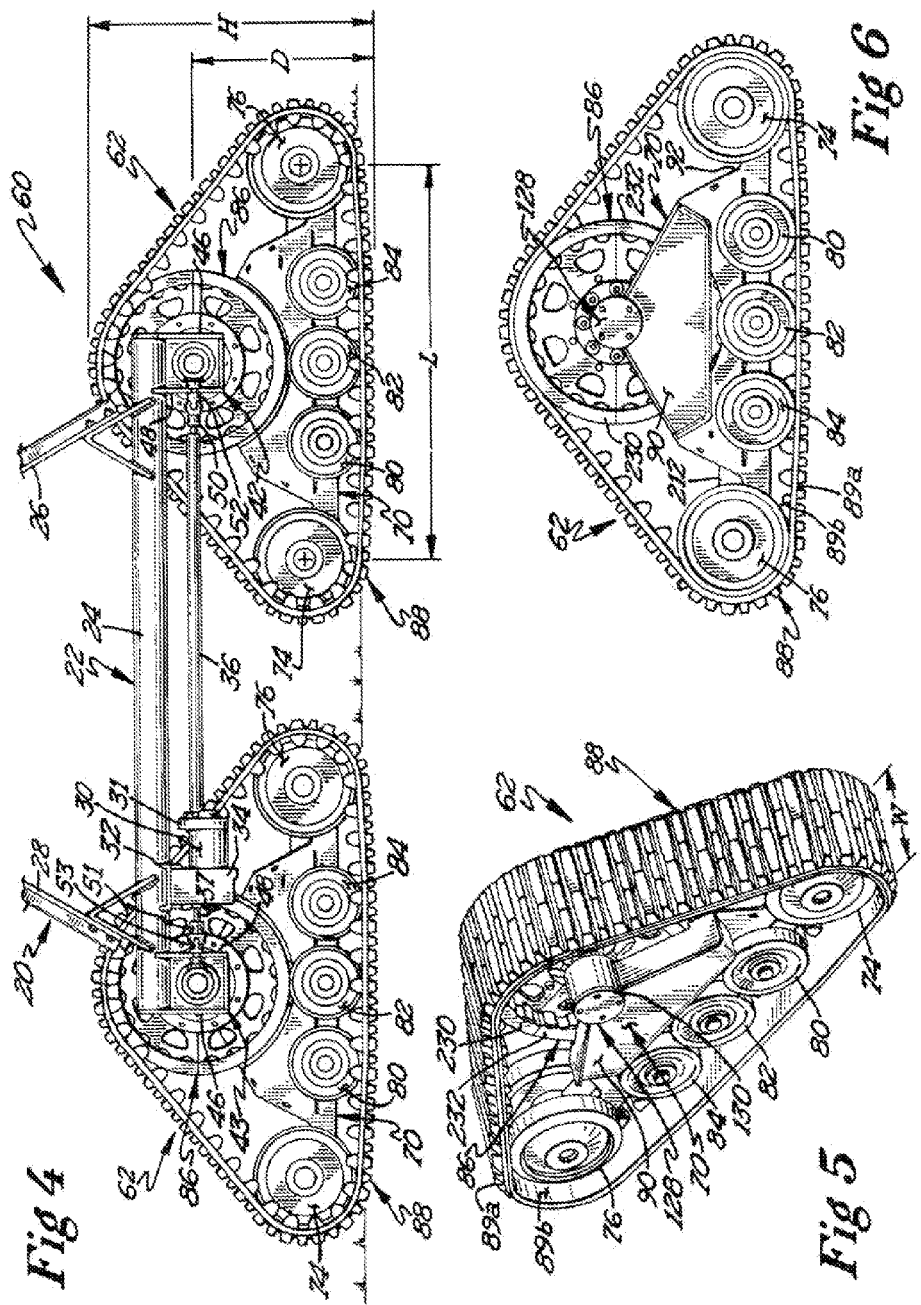

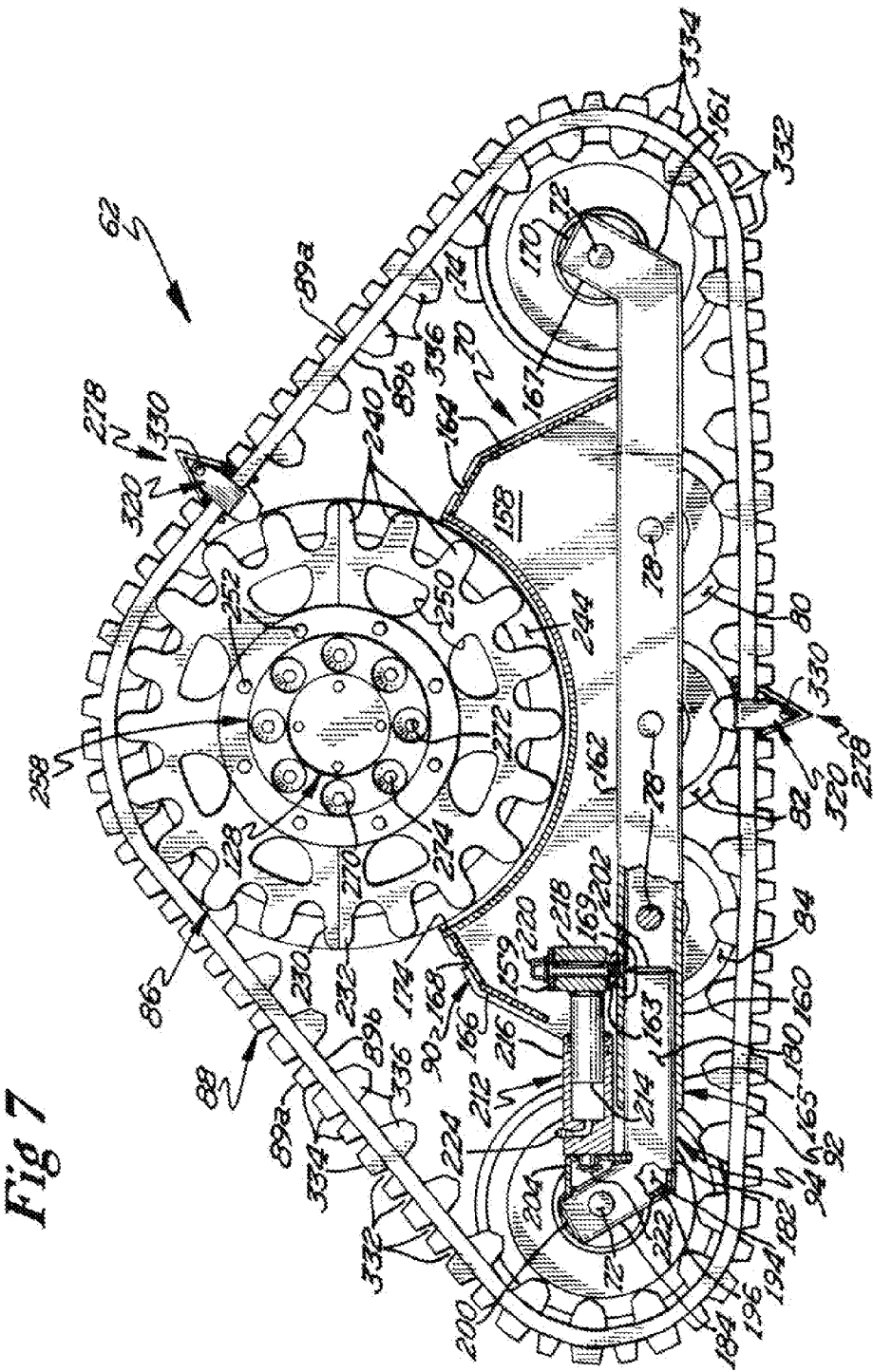

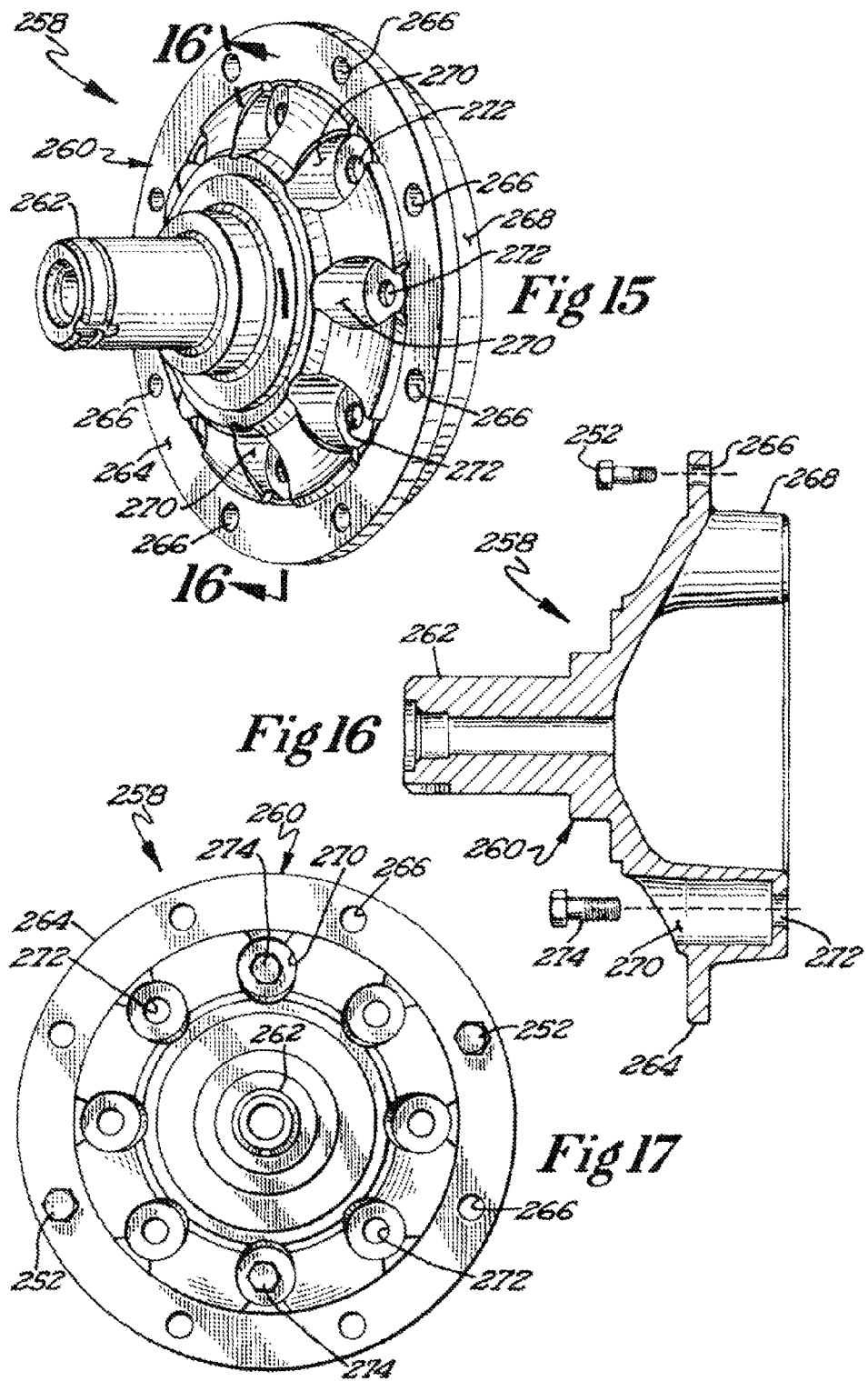

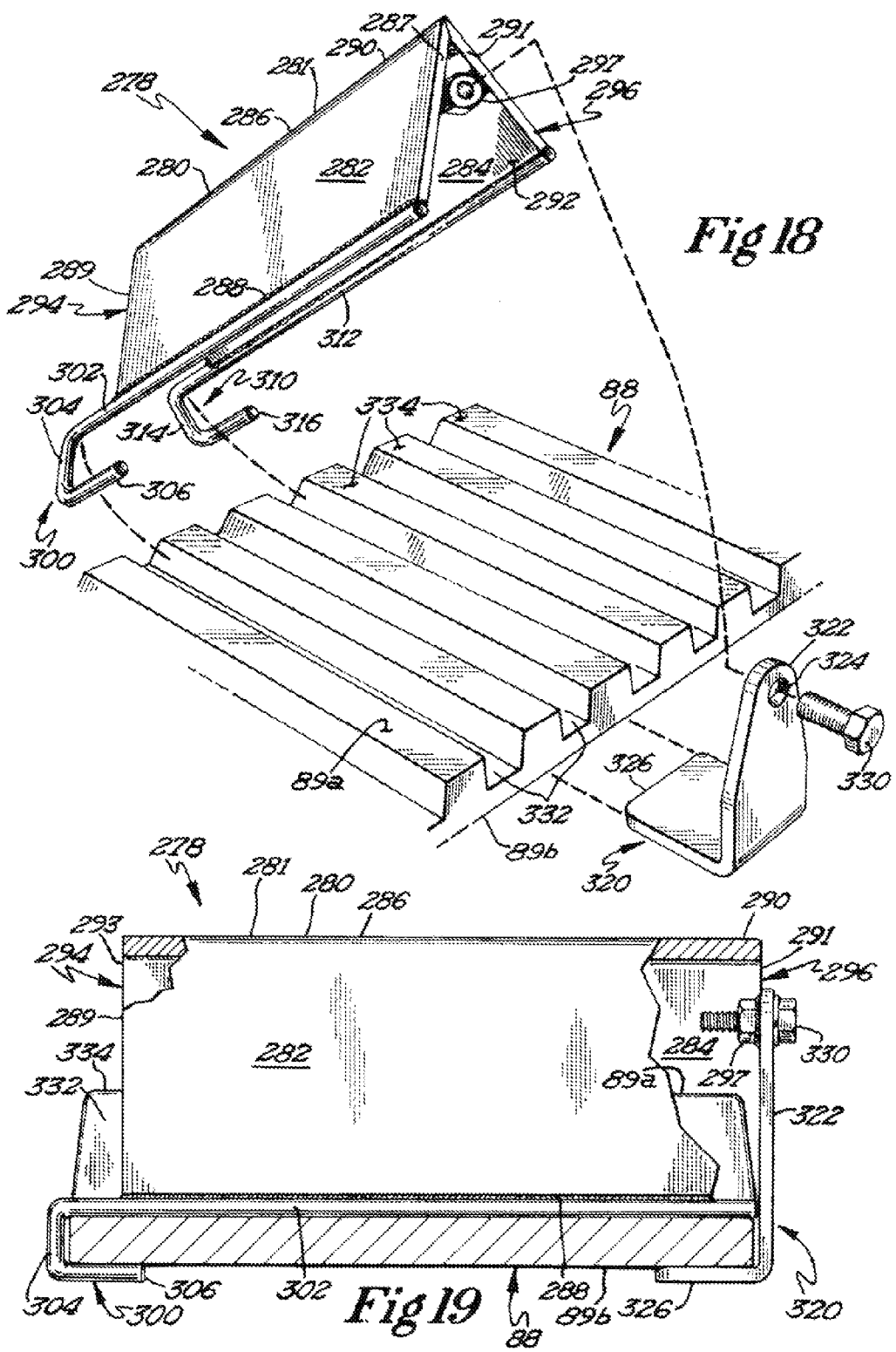

APPARATUS FOR CONVERTING A WHEELED VEHICLE TO A TRACKED VEHICLE

RELATED APPLICATIONS

This application is a National Stage entry under 35 U.S.C. §371 of PCT/US2008/075442, filed on Sep. 5, 2008, which claims priority to U.S. provisional application Ser. No. 60/970,764 filed on Sep. 7, 2007.

FIELD OF THE INVENTION

The present invention relates to an apparatus for converting a wheeled vehicle to a tracked vehicle. More specifically, the present invention relates to track systems that may be used to convert a self-propelled tire or wheel supported irrigation vehicle to self-propelled multi-track irrigation systems.

BACKGROUND OF THE DISCLOSURE

Self-propelled wheeled irrigation systems are old and well known in the art. Such systems were originally designed to provide irrigation for large parcels of land, particularly farmland. Such irrigation systems most often take the form of a central pivot irrigation system or a linear move irrigation system. In both types of systems, an elevated main water conduit or pipe is movably supported by one or more tower structures that include self-propelled tires or support wheels. Often, these irrigation vehicles are used in conditions where the surface upon which they traverse is not capable of supporting the weight of the self-propelled tire or wheel supported irrigation systems and they can become mired and/or lose traction. And, because the irrigation vehicles travel along prescribed paths, the tires or drive wheels tend to form ruts. This is exacerbated when portions of the path become wet and waterlogged. In such situations, the tires or drive wheels loose traction and one or more towers of the irrigation vehicle can lag behind the general motion of the vehicle, which can cause undue stress and strain on the towers and the main elevated water conduit or pipe, and could lead to failure. In some situations, a drive wheel section can become stuck, which again, can lead to failure of the vehicle. Undue stress and strain can also be result of tires or support wheels that have gone flat or lost significant amounts of air pressure, which can also cause one or more towers of the irrigation vehicle to lag behind the general motion of the vehicle. Therefore, tires or support wheels must be periodically checked to insure that they are properly inflated and that they have sufficient tread to operate as designed.

It will be appreciated from the foregoing, therefore, that prior art self-propelled wheeled irrigation vehicles present problems that are in need of solutions and there is a need for a self-propelled irrigation vehicle that is able to be used in conditions that would not otherwise be possible.

SUMMARY OF THE INVENTION

Generally, the present invention is an apparatus for converting the wheeled irrigation vehicle to a tracked vehicle. The apparatus for converting a wheeled vehicle to a tracked vehicle includes a track system that is configured and arranged to be attached to existing wheel hubs of the vehicle. Preferably the vehicle is a self-propelled, center-pivot, linear-move wheeled irrigation system, or the like.

A preferred embodiment of the track system that includes carriage having a hub support frame, a first wheel support frame and a second wheel support fame to which a sprocket, bogey wheels and idler wheels are rotatably mounted. A flexible, endless track is installed about the carriage so that its inner surface contacts the wheels and the sprocket, which drivingly engages a flexible, endless track.

The sprocket comprises a plurality of sprocket segments that are attached to an adaptor that is configured and arranged to be removably attached to an existing wheel hub flange of a wheeled irrigation vehicle. Preferably, the sprocket is a split sprocket. The adaptor includes a spindle that is rotatably attached to a hub, with the hub attached to spaced apart, generally parallel plates of a support structure. The hub support structure is attached to a first wheel support structure onto which a plurality of idler and bogey wheels are rotatably mounted. Preferably, the hub support frame is attached to the first wheel support structure in an offset manner to enable the sprocket to be positioned in alignment with the longitudinal axis of the first support structure. The carriage also includes a second wheel support frame that includes a plurality of idler wheels, and which is adjustably connected to the first wheel support frame such that the periphery defined by the sprocket, the idler and bogey wheels can be varied and the carriage is able to provide the optimal operational tension for the flexible, endless track.

The wheelbase of the carriage is preferably adjustable to facilitate installation and/or removal of the track and to maintain adequate tensioning as the flexible track ages. As explained above, the first and second wheel support frames are operatively connected to each other so that they can move relative to each other in a constrained manner. Preferably, the first and second wheeled frames are connected to each other so that they are able to change the wheelbase of the carriage and thus adjust the tension under which the flexible track operates. More preferably, the first and second wheel support frames are telescopingly connected to each other. The carriage also includes a tensioning apparatus that is operatively connected to the first and second wheel support frames. The tensioning apparatus includes an expandable and retractable force exerting member such as a grease cylinder, hydraulic cylinder or the like. In use, the tensioning apparatus urges the first and second wheel support frames away from each other along the general longitudinal axis of the carriage.

The adaptor, to which the sprocket segments are attached, also includes a ring extension that has a plurality of apertures that are configured and arranged to be aligned with bolt holes in the drive wheel flange of an existing wheeled irrigation vehicle. As will be understood, the apertures in the ring extension may be customized to enable the adaptor to be attached to differently configured wheel hubs.

In certain conditions, it may be desirable to increase the traction characteristics of the track assembly. This can be accomplished by providing the assembly with endless tracks having different tread designs and dimensions. However, replacement or substitute endless tracks are expensive and relatively time consuming to install. Moreover, the use of such replacement or substitute tracks is often transitory, and the need for such specialized or ground specific tracks is soon past. A preferred alternative to track replacement or substitution is to provide an endless track with one or more removably connectable cleats. Each cleat has a ground engaging member that is configured to increase the traction characteristics of the endless track to which it is connected. Each cleat also includes one or more attachment members that allow the cleat to be operatively connected to the track. As will be appreciated, an endless track may be provided with one or more cleats.

An object of the present invention is to provide a track assembly that can be used to convert a wheeled vehicle into a tracked vehicle, preferably a self-propelled, tracked irrigation vehicle.

Another object of the present invention is to provide a track assembly with a simplified track tensioning mechanism.

Yet another object of the present invention is to increase the traction of a track assembly without having to replace the endless track.

Additional advantages and features of the invention will be set forth in part in the description which follows, and in part, will become apparent to those skilled in the art upon examination of the following or may be learned by practice of the invention.

BRIEF DESCRIPTION OF THE DRAWINGS

FIG. 1 is a front elevational view of a known, self-propelled prior art irrigation vehicle of the type having a main elevated water pipe or conduit that is supported by one or more towers, with each tower including a plurality of powered, support tires;

FIG. 2 is a side elevational view taken from one end of FIG. 1;

FIG. 3 is a front elevational view taken from one end of FIG. 2;

FIG. 4 illustrates the prior art irrigation vehicle of FIGS. 1-3 in which the powered, support tires of a tower have been removed and replaced with track assembly units of the present invention;

FIG. 5 is a perspective view of one of the track assembly units of FIG. 4 in which the track assembly unit has been rotated to present a non-attachment or outboard side, the view taken from a point above and to the right of the track assembly unit;

FIG. 6 is an elevational view of outboard side of the track assembly unit of FIG. 5;

FIG. 7 is a cross-sectional, elevational view of the track assembly unit of FIG. 5.

FIG. 15 is a perspective view of an adaptor of the present invention;

FIG. 16 is a cross-sectional view of the adaptor of FIG. 15;

FIG. 17 is a front plan view of the adaptor of FIG. 15;

FIG. 18 is perspective view of an attachable cleat for use with a flexible track;

FIG. 19 is an elevational view of a cleat of the present invention as it may be attached to a flexible track;

DETAILED DESCRIPTION

Figure 8:
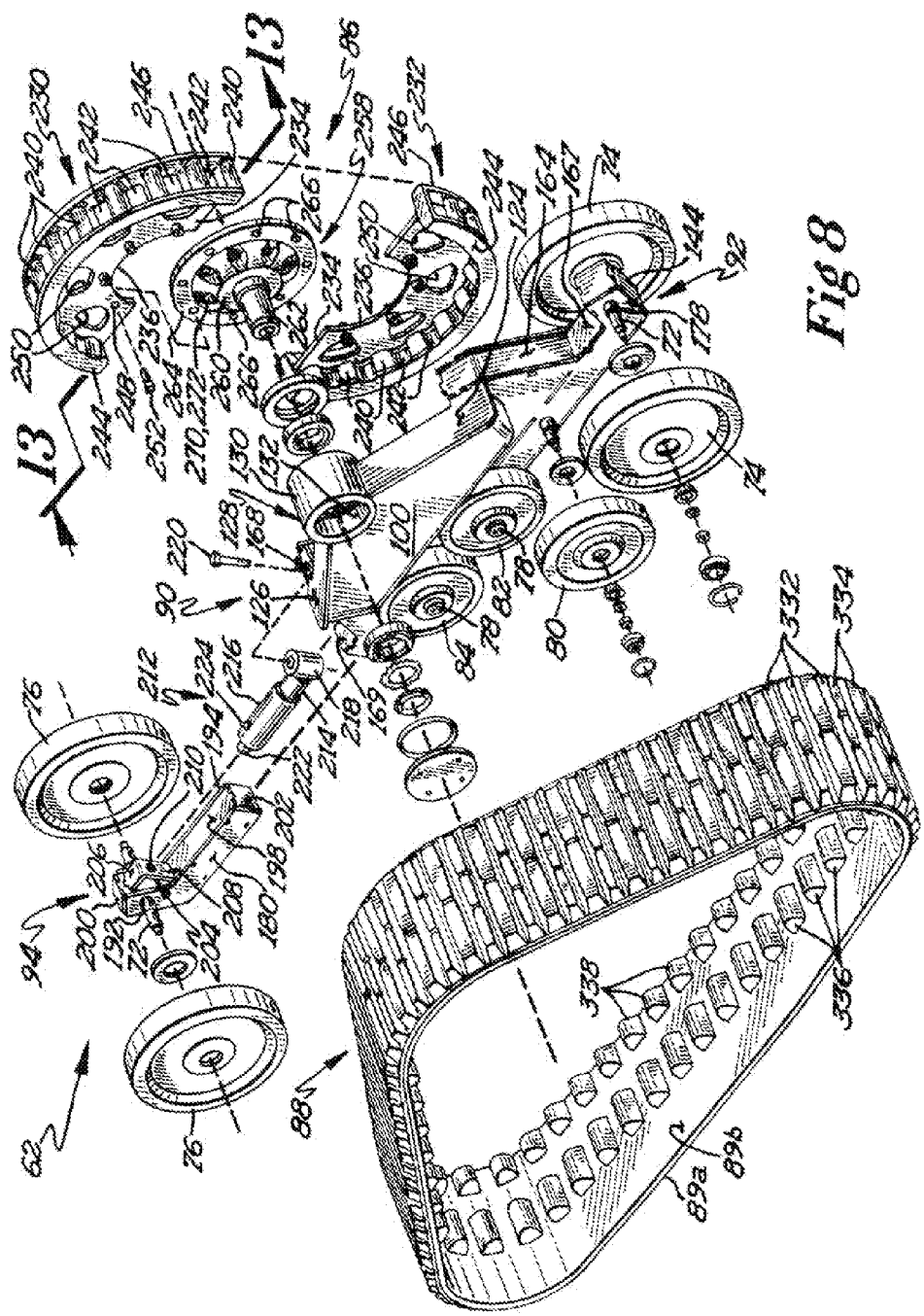
FIG. 8 is an exploded, perspective view of the track assembly unit of FIG. 5, taken from a point in front of, above and to the right of the track assembly.
Figure 9:
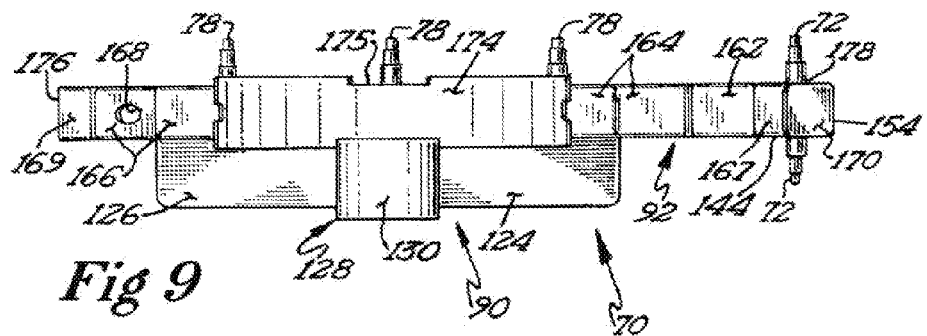
FIG. 9 is a top plan view of the first wheel support frame and the hub support frame, which is attached to the outboard side of the first wheel support frame, and which is offset from the vertical plane of the first wheel support frame.
Figure 10:
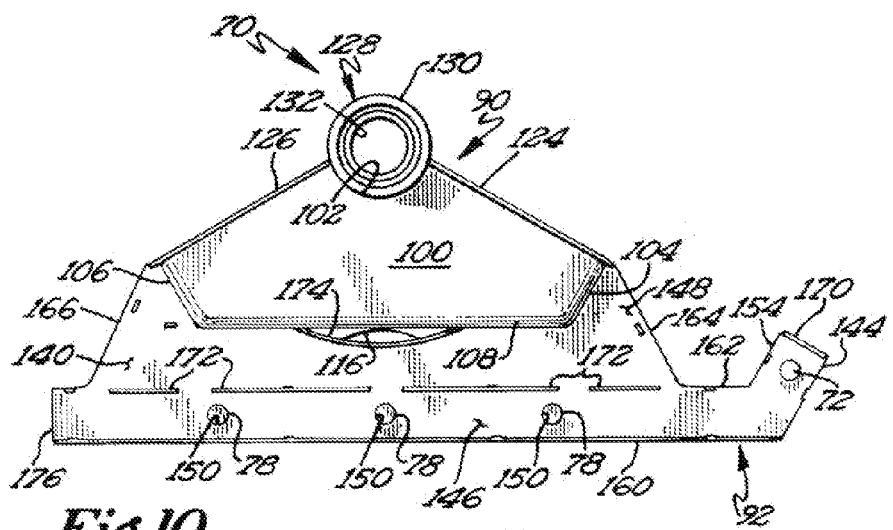
FIG. 10 is an outboard side elevational view of FIG. 9.
Figure 11:
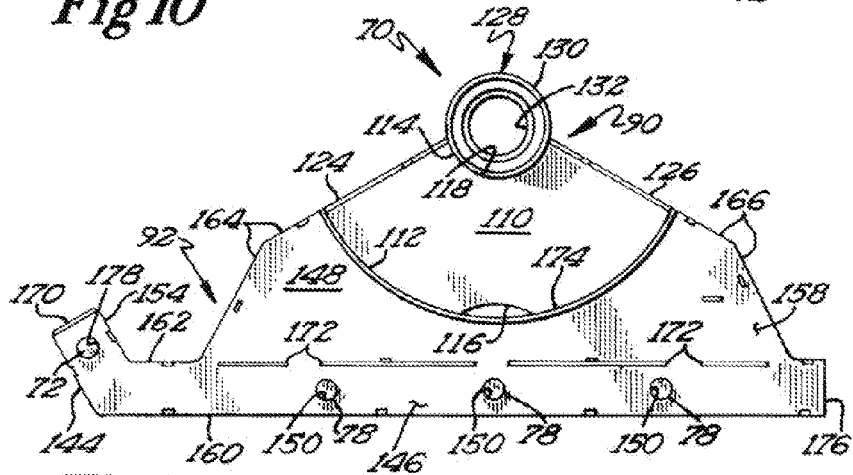
FIG. 11 is an inboard side elevational view of FIG. 9.

Referring initially to FIG. 1, a portion of a known prior art self-propelled irrigation vehicle 10 is shown. The typical prior art vehicle 10 generally comprises individual span units 12 that have a fluid conduit 14, with the fluid conduit supported by a truss assembly 16. The truss assembly 16 is, in turn, supported between movable support structures 20 that propel the individual span units 12 of the irrigation system.

Referring to FIG. 2, each prior art movable support structure 20 usually comprises a frame 22 having a main horizontal beam 24 and inclined braces 26, 28 that extend between the horizontal beam 24 and the truss assembly 16. Each movable support structure 20 has a power or motive source 30 with an optional brake 31, and a transmission 34 that are attached to the main beam 24 by a bracket 32. The support structure 20 also includes drive shafts 36, 37 that are connected to the power or motive source 30 via the transmission 34, and which terminate in universal joints 50, 51. The universal joints 50, 51 are, in turn, connected to input shafts 52, 53 connected to gear boxes 54, 55 that are received by mounting brackets 42, 43, respectively. The mounting brackets 42, 43 are attached at opposite ends of the main beam 24, and extend downwardly therefrom. Referring to FIG. 3, each gear box mounting bracket 42, 43 is generally u-shaped and includes a lateral wall 44 with a center aperture and circumferential gear box attachment apertures, and opposing inboard and outboard end walls 46, 48. When attached to a main beam 24, the lateral wall 44 is generally parallel to the main beam 24 and the end walls 46, 48 are generally transverse to the longitudinal axis of the main beam 24. Preferably, outboard end wall 46 is configured so that it is able to cover the end of the main beam 24, while the inboard end wall includes a cutout that corresponds to the bottom surface of the main beam 24. Each gear box 54, 55 is connected to one side of the lateral wall 44 of a respective mounting bracket 42, 43 such that its output section (not shown) is able to extend through the lateral wall and through a cover assembly 56 that is attached to the other side of the lateral wall. As can be seen in FIG. 3, the output section of each gear box 54, 55 is ultimately connected to a hub with a flange 58 that may include fastening elements 59. A tire or support wheel 38, 40 of the self-propelled irrigation vehicle 10 is attached and secured to each flange 58 with fastening elements 59 and lug nuts (not shown) in a conventional manner.

Briefly, FIG. 4 illustrates an irrigation vehicle 60 combined with track assemblies 62 of the present invention. Generally, each track assembly 62 includes a carriage 70 that supports a plurality of idler wheels 74, 76, internally positioned bogey wheels 80, 82, 84, a drive sprocket 86 and a flexible, endless track 88. As can be seen, each pneumatic drive wheel or tire has been removed and replaced by one track assembly or unit 62. Advantageously, each track unit 62 has a connection point with an elevation or height "D" that permits the irrigation vehicle 60 to operate with substantially the same ground clearance that is provided with wheeled versions. As is further discussed below, each track unit 62 preferably has a maximum height "H" of around 38 inches (96 cm) and a wheelbase "L" that is defined by the distance between the rotational axes of idler wheels 74, 76, which are attached to shafts 72. Preferably, the wheelbase "L" is around 53 inches (134 cm).

However, as will be apparent, the length of the wheelbase "L" can preferably be varied by about plus or minus 8 inches (20 cm). As will be appreciated, this allows the carriage 70 to accommodate changes to the track 88 as it ages. It also allows the carriage to accommodate similar endless tracks that may be fabricated by manufactures other than the original manufacturer, or endless tracks that may be different or which may have different applications than the original flexible, endless tracks. With the present invention, the track 88 has a preferred width "W" is around 15 inches (38 cm) and an inner periphery or pitch length of around 166 inches (421 cm).

FIGS. 5-8 illustrate, in greater detail, a track assembly or unit 62 of the present invention in isolation. FIGS. 5 and 6 are outboard views that show a track assembly 62 unit with its carriage 70 that supports paired idler wheels 74, 76 located at either end, pairs of bogey wheels 80, 82, 84 located between the idler wheels, and a sprocket 86. Preferably, the sprocket 86 is a split sprocket and includes first and second sections 230, 232. Note, in FIG. 7, that the carriage 70 has a u-shaped recess having a radius that is larger than the radius of the sprocket 86. This allows the sprocket 86 and its fastening elements 252 to be easily accessed from a transverse direction, relative to the track assembly 62. As will be understood, this arrangement facilitates relatively unhindered servicing, attachment and removal of the sprocket 86 to an adaptor 258, because the sprocket parts and fastening elements are not covered or obscured by portions of the carriage 70. Moreover, it will be appreciated that the sprocket 86 may be connected to the adaptor 258, the sprocket and adaptor connected to a wheel hub of an irrigation vehicle, and then the sprocket and adaptor connected to a carriage of a track assembly unit 62 (with the carriage being mounted on to a spindle 262 that extends transversely from the adaptor 258). Conversely, the sprocket 86 may be connected to the adaptor 258, the sprocket and adaptor connected to a carriage of a track assembly unit 62, and the track assembly connected to a wheel hub of an irrigation vehicle. It will also be understood that when a track assembly unit 62 is connected to a wheel flange of an irrigation vehicle, the track assembly unit will be able to tilt or rotate without being constrained. This feature enables the track assembly unit to have the ability to surmount obstacles or barriers. It also enables the track assembly unit to maintain maximum contact with the ground while the track assembly unit traverses undulating surfaces such as swales. Preferably the track assembly unit has a normal operational range of rotation that is about plus or minus 45 degrees from the horizon. As will be disclosed below, for steep grades, a user of the track assembly unit may provide the unit with optional cleats. FIGS. 5 and 8 are perspective outboard views of the track unit 62 that depict the hub support frame 90, which is laterally offset from the wheel support frames 92, 94 of the carriage 70. FIG. 6 is a side elevational view of FIG. 5 and it shows how plates 234 of each sprocket segment 230, 232 are connected to the adaptor 258.

Figure 12:
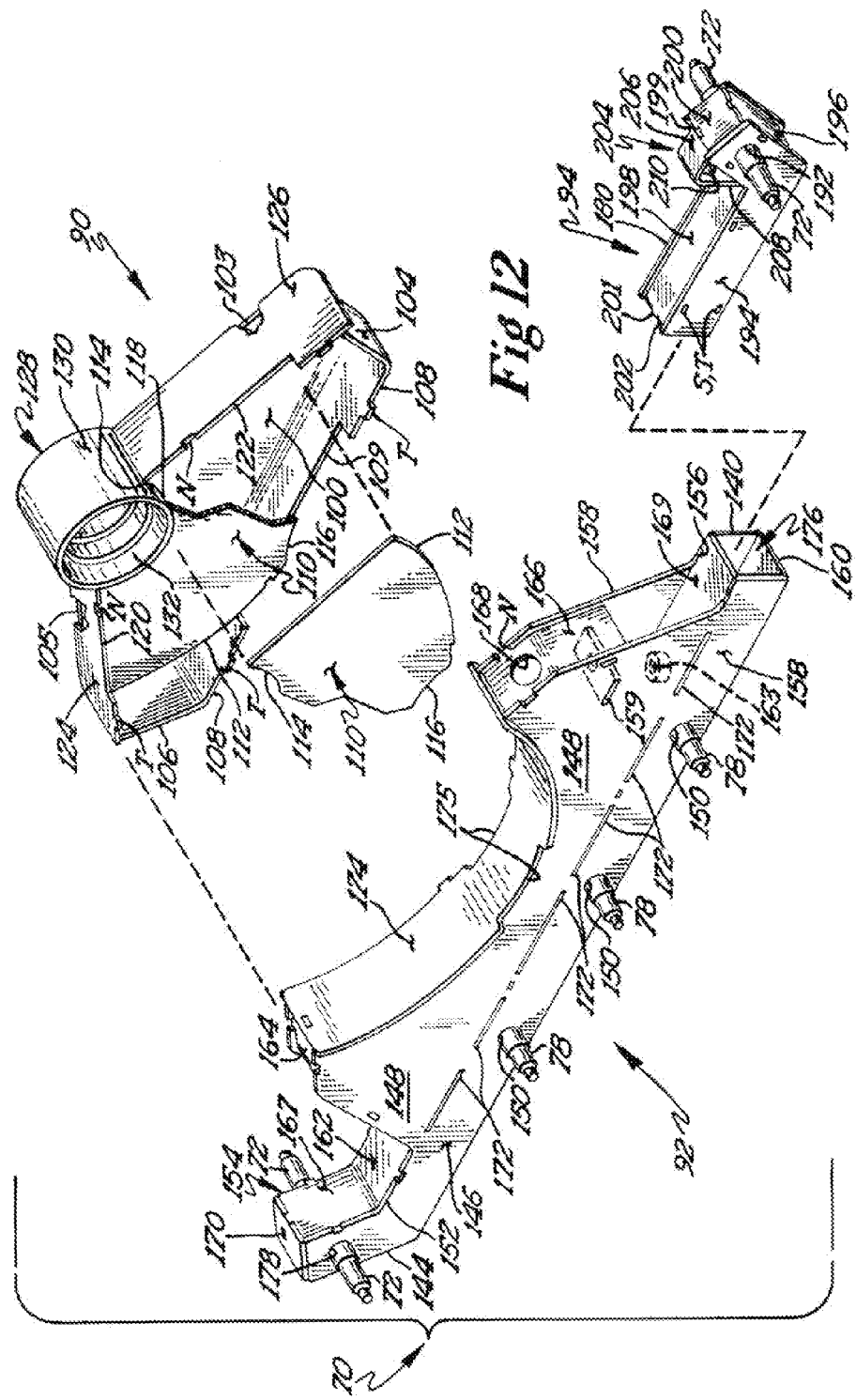
FIG. 12 is a partially exploded, perspective view of the hub support frame and the first and second wheel support frames of the carriage frame of the present invention, the view taken from a point behind, above and to the left.

More specifically, the carriage frame 70 of the present invention can be divided, generally, into three components. The first component is a hub support frame 90. The second component is a first wheel support frame 92, and the third component is a second wheel support frame 94. With particular attention to FIGS. 9-12, the hub support frame 90 generally comprises plurality of plates 100, 110 that are connected to each other to form a box-like structure having parallel, spaced-apart, arcuately-shaped notches or cradles 102, 118 that are configured to receive and support a hub 128 having an exterior surface 130 and an interior surface 132. As can be seen, the hub 128 is in the form of a sleeve, with the interior surface 132 configured and arranged to rotatably engage and support a spindle 262 of an adaptor 258, discussed below. The hub support frame 90 comprises a generally vertically oriented outboard plate 100, a generally vertically oriented inboard plate 110, and a plurality of top plates 124, 126 that connect the outboard and inboard plates together to form a partial enclosure. Preferably the plates 100, 110, 124 and 126 are provided with tabs "T" and/or slots "S" and notches "N", which facilitate dry assembly of the partial enclosure prior to final weld-up. The generally vertically oriented outboard plate 100 is generally triangularly shaped and includes a truncated apex with a notch 102, two side extensions 104, 106 and a bottom extension 108. The extensions 104, 106, 108, which are preferably generally rectangular and have substantially the same width, are bent inwardly approximately ninety degrees relative to the plane of the outboard plate 100 to form the side and bottom walls of the hub support frame 90. The generally vertically oriented inboard plate 110 is generally arcuately-shaped and includes outer and inner circumferences 112, 114 that have inwardly directed notches 116, 118 and radial edges 120, 122 that extend between the outer and inner circumferences. Note that the outer circumference 112 is configured to substantially match the curvature of the side edge of top plate 174, to which it is ultimately connected. As explained above, the notch or cradle 118 is configured to cooperate with the notch or cradle 102 of the outboard plate 100 to receive and support the hub 128. The notch or cutout 116 located on the outer circumference 112 of the inner plate 110 is configured and arranged to provide a relief or clearance for a bogey wheel positioned therebelow. The upper edges 105, 103, 120, 122 of the outboard plate 100 and the inboard plate 110, respectively, are connected to each other by rectangularly shaped top plates 124, 126. As best depicted in FIG. 12, a portion of the bottom extension 108 is provided with a generally rectangularly-shaped cutout 109 that is configured to provide clearance for a bogey wheel positioned therebelow. The edge portions on either side of the cutout 109 of the bottom extension 108 of the outboard plate 100 are connected to the inboard plate 110. As can be appreciated, this produces a rigid, lightweight structure that is able to support the hub 128. It will be understood that the components of the hub support frame 90 may be provided with tabs "T" and slots "S" and/or tabs "T" and cutouts or notches "N" that facilitate assembly and ensure that the components will be correctly positioned prior to final assembly. An important feature of the hub support frame 90 is that it is offset relative to the first and second wheel support frames 92, 94. As will be appreciated, this offset positions the sprocket 86 so that it is in alignment with the idler wheels 74, 76, the bogey wheels 80, 82, 84 and the endless track 88. It will also be appreciated that the hub support frame 90 protects the lower, outwardly facing portion of the sprocket 86 from dirt and debris or other extraneous matter that might otherwise compromise normal operation of the track assembly 62.

With particular attention to FIGS. 9-12, the first wheel support frame 92 generally comprises plurality of plates that are connected to each other to form a substantially enclosed, box-like structure having a recess that is configured to accommodate the drive sprocket 86 so that it may freely rotate and be easily accessed. More specifically, the wheel support frame 92 comprises a generally vertically oriented outboard plate 140, a generally vertically oriented inboard plate 158 and a plurality of top, bottom, side and intermediate plates 174, 160, 164, 166, 162, respectively, that connect the outboard and inboard plates 140, 158 together in a generally parallel relation. In preferred embodiments, the vertically oriented outboard plate 140, to which the hub support frame 90 is attached, includes a generally linear bottom edge 142 having one end that terminates in an upwardly angled portion 144, an intermediate section 146 that is generally parallel with the bottom edge 142, and an upwardly facing, generally u-shaped section 148 that extends from the intermediate section 146. The intermediate section 146 of the outboard plate 140 is provided with a plurality of apertures 150, 178 that are configured and arranged to receive shafts 78, 72 upon which the pairs of bogey 80, 82, 84 and idler wheels 74, 76 are rotatably mounted. In addition, one end of the intermediate section 146 has an upper edge 152 that cooperates with the upwardly angled portion 144 of the bottom edge 142 and the inboard and outboard plates 158, 140 to form an angled first arm 154, while the other end of the intermediate section 146 has an upper edge 156 that is in linear alignment with the bottom edge 142 of the outboard plate 140 and the longitudinal axis of the first wheel support frame 92. The generally vertically oriented inboard plate 158 is similarly constructed and arranged.

The generally vertically oriented inboard and outboard plates 158, 140 are connected to each other by a series of plates 174, 160, 164, 166, and 162. More specifically, the vertical inboard and outboard plates 158, 140 are preferably connected to each other by an angled bottom plate 160 (with angled end 161 and free end 165), an angled intermediate plate 162 (with angled end 167 and free end 169), angled side plates 164, 166, a cap 170, and an arcuately shaped top plate or saddle 174 that forms the recess for the drive sprocket 86. As with the previously described components, the plates 140, 158, 160, 164, 166, the cap 170 and the top plate 174 are preferably provided with tabs "T", slots "S", and/or notches "N", which facilitate assembly and ensure that the components will be correctly positioned prior to final assembly. Note that the sides of the intermediate plate 162 include a plurality of tabs "T" that are configured to be received in slots "S" in the inboard and outboard plates 158, 140. Spaced in between the tab slots "S" are elongated plug weld slots 172 that are filled with weld material during final assembly of the first wheel support frame 92. The top plate or saddle 174, which is located above the intermediate plate 162 and the plug weld slots 172, preferably includes one or more notches or cutouts 175 that provide relief or clearance for a pair of bogey wheels 82 positioned on either side of the support frame 92. Note that one of the segments of the angled side plate 166 is provided with an aperture 168 through which a fastening element 220 for a tensioning apparatus 212 may be accessed, with the fastening element 220 received in a transversely oriented, apertured flange 159, and attachable to a threaded aperture 163 located on intermediate plate 162. As will be understood, the outboard, inboard, bottom and intermediate plates 140, 158, 160, 162 located at the free end 167 of the wheel support frame 92 form a tunnel or conduit 176 that is configured and arranged to telescopically receive an end of the second wheel support frame 94. Preferably, the tunnel or conduit 176 has a polygonally shaped cross-section. More preferably, the tunnel or conduit 176 has a substantially square cross-section.

With particular attention to FIGS. 7, 8 and 12, the second wheel support frame 94 generally comprises plurality of plates 180, 194, 196, 198, 202, and a 200 that are connected to each other to form a box-like structure having an angled arm 190 that is configured to receive a shaft 72 for one set of the idler wheels 76. More specifically, the second wheel support frame 94 comprises a generally vertically oriented outboard plate 180, a generally vertically oriented inboard plate 194, a cap 200 and plurality of top, bottom and end plates 198, 196, 202 that connect the generally vertically oriented outboard and inboard plates 180, 194 together in a generally parallel relation. The preferred outboard plate 180 is generally L-shaped and includes a generally linear bottom edge 182 that terminates in an upwardly angled portion 184, and a generally linear top edge 186 that also terminates in an upwardly angled portion 188 to form an angled second arm 190. The outboard plate 180 is provided with an aperture 192 that is configured and arranged to receive a shaft 72 upon which the idler wheel pair 76 is mounted. The inboard plate 194 is similarly constructed and arranged. The outboard and inboard plates 180, 194 are connected to each other by a cap 200 and series of plates 196, 198, 202. More specifically, the outboard and inboard plates 180, 194 are connected to each other by an angled bottom plate 196, an angled top plate 198, a cap 200 and an end plate 202.

Preferably, the plates of the wheel support frame 94 are provided with corresponding tabs "T" and notches "N" or tabs "T" and slots "S" (see, for example, end tab "T" located adjacent the end 201 of top plate 198 and notch "N" of end plate 202; and side tabs "T" of top plate 198 that fit into slots "S" of plates 194, 180). The tabs "T" and notches "N" or slots "S" allow the components of the support frame 94 to be assembled together and welded without the need for specialized jigs or fixtures.

In addition, the second wheel support frame 94 is provided with a generally L-shaped bracket 204 that has a top surface 206, an engagement surface 208 and an aperture 210 that is located in the engagement surface 208, and which is configured and arranged to be operatively connected to a portion of the tensioning mechanism or apparatus 212. Preferably, the bracket 204 is connected to an angled end 199 of the top plate 198 of the wheel support frame 94, so that the center axis of the aperture 210 is generally parallel to the longitudinal axis of the second wheel support frame 94. As with the other components of the support frame 94, the bracket 204 and the top plate 198 are provided with tabs "T" and slots "S" that engage each other to facilitate assembly. The second wheel support frame 94 is preferably configured to be telescopically received within the tunnel structure 176 defined by the outboard 140, inboard 158, bottom 160 and intermediate plates 162 of the first wheel support frame 92. As will be appreciated, embodiments of the invention are not limited to two wheel support frames and that the angled first arm portion 154 of the first wheeled frame 92 may be replaced with a third wheeled frame (not shown) similar to the second wheeled frame 94 without departing from the spirit and scope of the invention.

Figure 13:
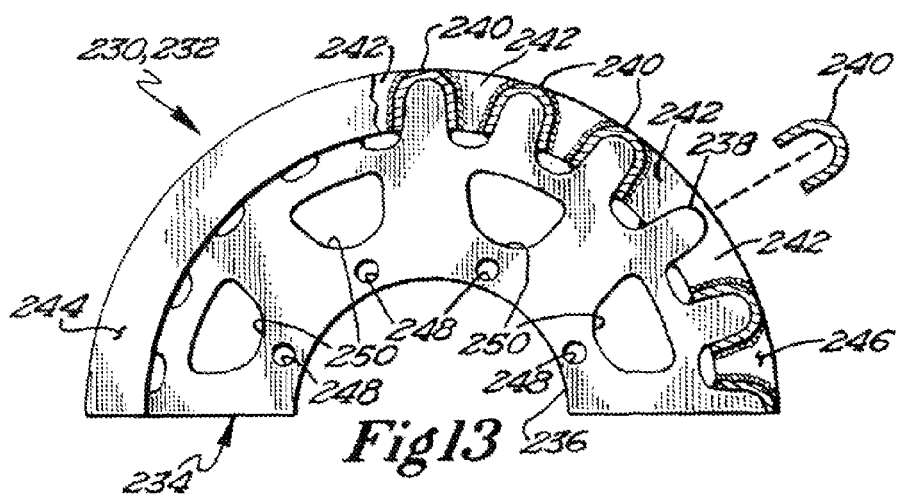
FIG. 13 is a side elevational view of a sprocket segment of the present invention.
Figure 14:
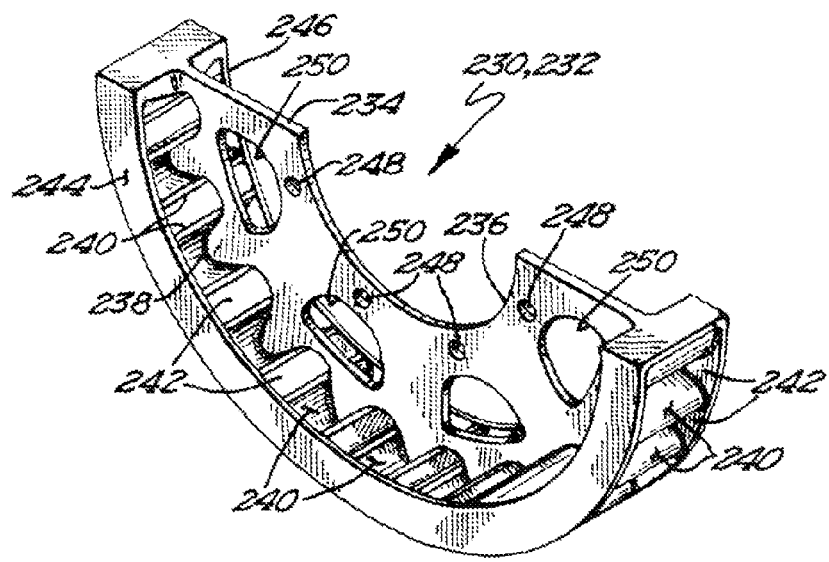
FIG. 14 is a perspective view of a sprocket segment of the present invention.
Figure 20:
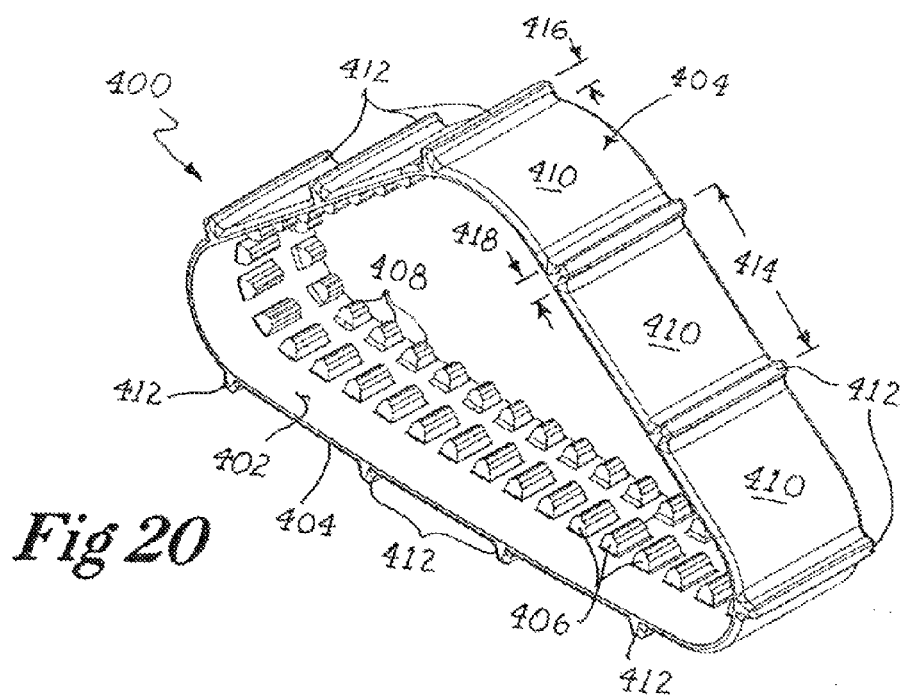
FIG. 20 is a perspective view of an alternative embodiment of a flexible, endless track, the view taken from a point in front of and to the right of the track.
Figure 21:
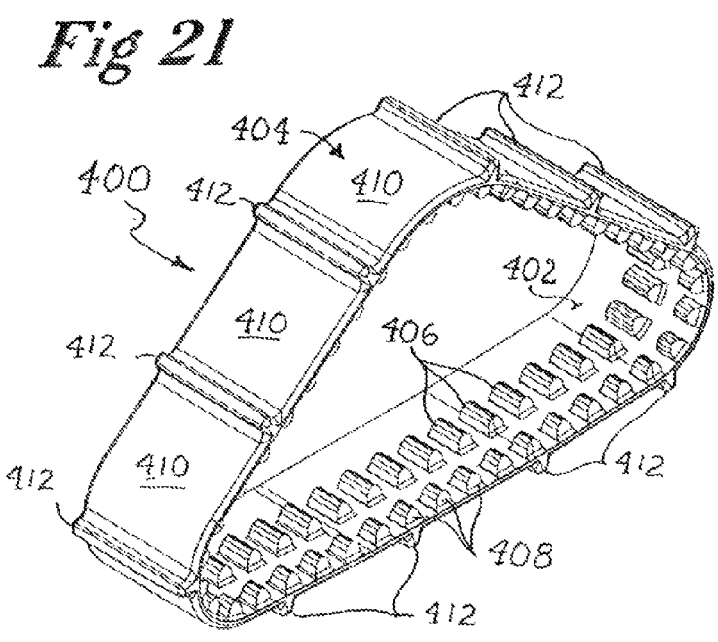
FIG. 21 is a perspective view of the endless, flexible track of FIG. 20, taken from a point in front of and to the left of the track; and, FIG. 22 is a bottom plan view of the endless, flexible track of FIG. 20.
Figure 22:
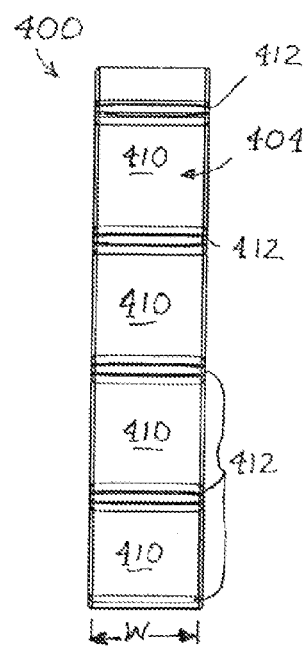

Although it is possible to use a unitary sprocket, a split sprocket 86 having first and second segments 230, 232, is preferred. As depicted in FIGS. 13 and 14, the sprocket 86 comprises two sprocket segments 230, 232 that, when attached to an adaptor 258, form one sprocket 86 (see also, FIGS. 7 and 8). Each sprocket segment 230, 232 comprises an arcuately shaped plate 234 having inner and outer circumferences 236, 238. A plurality of teeth or bars 240 is evenly spaced about the outer circumference 238 in a transverse orientation and the ends of the teeth or bars 240 are connected by side walls or rims 244, 246. The teeth 240 and side walls 244, 246 define openings or gaps 242 therebetween, with the gaps 242 configured to receive and engage inwardly extending projections 336 of a flexible track 88 (see, FIG. 8). The plate 234 also includes a plurality of apertures 248 spaced evenly about and adjacent to the inner circumference 236, with the apertures 248 configured to be aligned with apertures 266 in a flange 264 that extends from the body 260 of the adaptor 258, and secured thereto with a plurality of fastening elements 252 (see, for example FIGS. 7 and 8). Additionally, the preferred plate 234 also includes a plurality of larger apertures 250 that serve to reduce the weight of the plate 234. Preferably, the sprocket segments 230, 232 are formed by casting.

The adaptor 258 is used to connect each track unit 62 to the wheel flange 58 of an irrigation vehicle 10, whose wheel or tire has been removed. As shown in FIGS. 15-17, the adaptor 258 has a body 260 with a spindle 262, a flange 264 with apertures 266, and a ring extension 268. More specifically, the spindle 262 is configured and arranged to be rotatably mounted within the spindle receiving aperture 132 of the hub 128 of the hub support frame 90 (see, FIG. 8). The flange 264, which is located at the periphery of the adaptor 258, is provided with a plurality of apertures 266 that are configured and arranged to be aligned with apertures 248 in the sprocket 86 and secured thereto with fastening elements 252 (see also, FIG. 8). The ring extension 268 extends away from the body 260 of the adaptor 258 in a direction opposite from that of spindle 262. As depicted, the ring extension 268 is generally circular and is provided with a plurality of wells 270, the bottoms of which have apertures 272 that are configured to be aligned with apertures in the wheel flange 58 of the irrigation vehicle 10 and secured thereto with fastening elements 274.

In order to maintain proper tension on the endless track 88 and to assist in its installation and removal, a tensioning apparatus 212 is provided. Preferably, the tensioning apparatus 212 is operatively secured to the first wheel support frame 92 and the second wheel support frame 94. With particular attention to FIGS. 7, 8, and 12, the tensioning apparatus 212 is generally parallel to the longitudinal axes of the first wheel support and second wheel support frames 92, 94. Preferably, the tensioning apparatus 212 comprises a piston 214 that is telescopically connected to a cylindrical housing 216, with the piston and housing of the tensioning apparatus 212 linearly extendable under pressure exerted from a non-compressible material such as hydraulic fluid or grease. As shown in FIG. 7, the tensioning apparatus 212 is arranged so that a pin or stub 222 at the free end of the housing 216 is insertably received in the aperture 210 of bracket 204 and secured thereto by a fastener, such as a circlip. At the other end, a pineye mount 218 located at the free end of piston 214 is connected to the first wheel support frame 92 by a threaded fastening element 220. As shown, the pineye mount 218 is bounded by and vertically aligned with a transversely oriented, apertured flange 159 and a threaded aperture 163 that is located on intermediate plate 162. The fastener 220 is inserted through the aperture of flange 159, through the pineye mount 218 and into threaded aperture 163. As shown, the transverse flange 159 is attached to the vertically oriented outboard and inboard plates 140, 158 at a location located above intermediate plate 162. This positions the tensioning apparatus 212 so that it is substantially parallel to the longitudinal axes of the first and second wheel support frames 92, 94. Note that fastening element 220 is accessible through aperture 168 located in side plate 166. Note also that when the tensioning apparatus is installed, a portion of the tensioning apparatus will be protectively positioned within the interior of the first support wheel frame 92. Alternatively, the pineye mount 218 may be rotated 90 degrees so that the connection points to the first wheel support frame 92 will be at the vertically oriented inboard and outboard plates 140, 158. The wheelbase "L", as defined by the idler wheel shafts 72, can be varied as the free end of the second wheel support frame 94 moves within the tunnel or conduit 176 formed in the first wheel support frame 92. The amount of movement depends upon the force exerted by the tensioning apparatus 212, which can be adjusted via a grease fitting 224. This allows the track assembly 62 to compensate for changes in the track 88 due to wear, tear and age. It also allows the track assembly 62 to accommodate similar endless tracks that may be fabricated by manufactures other than the original manufacturer, or endless tracks that may be different or which may have different applications than the original flexible, endless tracks. Preferably, the tensioning apparatus 212 is a grease cylinder. It will be understood, however, that other tensioning mechanisms may be used without departing from the spirit and scope of the invention. For example, threaded linear actuators, pneumatic actuators, spring elements, or combinations thereof.

Generally, assembly of the carriage frame is facilitated by the use of tabs "T", which fit into slots "S" or notches "N" in corresponding parts. As adjacent parts are fitted together using the tabs "T" and slots "S" and/or notches "N", the parts are tack welded to each other. Then, after the carriage frame has been further assembled, the parts are fully welded together.

In certain instances, when a track assembly 62 becomes mired or faces obstructions such as unusually large mounds of soil, one or more traction cleats 278 can be removably attached to the flexible, endless track 88. With particular attention to FIGS. 7, 18 and 19 it will be appreciated, that a portion of each cleat 278 will project beyond the ground contacting portion of the outer or exterior surface 89a of the track 88 to enable the track to better engage the surface over which it travels. Once the track 88 has cleared the offending area or obstruction, the cleat or cleats 278 can be removed. Preferably, each cleat 278 comprises a body 280 with a ground engaging member 281 that includes two working surfaces that comprise elongated, generally rectangularly-shaped plates 282, 284 with each plate 282, 284 having first and second elongated edges 286 and 288, 290 and 292, and first and second side edges 287 and 289, 291 and 293, respectively. The plates 282, 284 are connected to each other along their second elongated edges 288, 292 forming an apex and positioning their respective first elongated edges 286, 290 so that they diverge away from each other. A preferred range of angles formed by plates 282, 284 is around 10-60 degrees. It will be understood that the ground engaging member 281 is not limited to two plates. Other configurations are possible without departing from the spirit and scope of the invention. For example, the ground engaging member 281 may have an inverted T-shaped cross-section, or a somewhat rounded cross-section (not shown). In addition, it is envisioned that the ground engaging member 281 could comprise a plurality of separate ground engaging members mounted on the body of the cleat (not shown).

Each cleat 278 further comprises first and second attachment members 300, 310 are connected to the first elongated edges 286, 290 of the respective plates 282, 284. Preferably, each attachment member 300, 310 is generally J-shaped or U-shaped and includes a generally elongated first section 302, 312 that extends along the edge of a respective plate 282, 284, a second section 304, 314 that is generally perpendicular to a respective first section 302, 312, and a third section 306, 316 that is generally perpendicular to a respective second section 304, 314 and generally parallel to a respective first section 302, 312. The first and second attachment members 300, 310 are attached to the first and second plates 282, 284 so that the respective second and third sections 304 and 314, 306 and 316 are adjacent the first end 294 of the body 280 of the cleat 278. Each cleat 278 further comprises a third attachment member 320 is removably connected to the second end 296 of the body 280 of the cleat 278. As shown, the third attachment member 320 includes a side wall 322 having an aperture 324 and an extension 326 that is generally perpendicular to the side wall 322, and which, like the third sections 306, 316 of the first and second attachment members 300, 310, is spaced from the edges 286, 292 of plates 282, 284. In use, the third sections 306, 316 of the first and second attachment members 300, 310 and the extension 326 of the third attachment member are in a confronting relation. The third attachment member 320 is removably connected to the second end 296 of the cleat 278 by way of a fastening element 330. Preferably, the fastening element 330 is a threaded fastener that extends through the aperture 324 in the side wall 322 and engages a threaded aperture 298 of element 297, which is attached to the cleat body 280.

Attachment of a cleat 278 of the present invention onto a flexible endless track 88 can be accomplished by first removing the third attachment member 320, if it is attached to the cleat body 280. Then, making sure that the portion of the track 88 to which the cleat 278 will be attached is relatively free of dirt and mud, the cleat 278 is positioned so that the first and second attachment members 300, 310 are aligned with parallel, transverse channels or grooves 332 that are formed between lands 334 on the outer or exterior surface 89a of the flexible track 88. As will be appreciated, the first sections 302, 312 of the first and second attachment members 300, 310 are configured and arranged to be positioned within the parallel channels or grooves 332 of the track 88 as the cleat 278 is attached to the track. When the cleat 278 is attached to the track 88, the third sections 306, 316 of the first and second attachment members 300, 310 will be positioned adjacent to in operative contact with the inner or interior surface 89b of the track 88, and the second sections 304, 314 of the first and second attachment members 300, 310 will be positioned adjacent to or in operative contact with one edge of the track 88. With the cleat 278 thus positioned, the cleat may be secured to the track 88 with the third attachment member 320, whose extension 326 will also be positioned adjacent the inner or interior surface 89b of the track 88, and whose side wall 322 will be positioned adjacent the opposite edge of the track 88. Note that the third sections 306, 316 of the first and second attachment members 300, 310, and the extension 326 of the third attachment member 320 are configured and arranged so as to avoid interfering with projections 326, 328 of the inner or interior surface 89b of track 88. Removal of the cleat 278 is achieved by reversing the foregoing steps.

An alternative, preferred embodiment of an endless, flexible track is shown in FIGS. 20-23. This embodiment comprises an endless, flexible track 400 that comprises a band with side edges, an inner or interior surface 402 and an outer or exterior surface 404, with the inner surface including two rows of inwardly extending projections 406, 408. As with endless track 88, the inwardly extending projections 406 are centrally located and are configured and arranged to be engaged by a drive sprocket 86 and to pass between the paired idler 74, 76 and bogey 80, 82, 84 wheels. The inwardly extending projections 408 are primarily used to guide the track 400 about the idler 74, 76 and bogey 80, 82, 84 wheels of the track assembly unit 62. The exterior surface 404 differs from the exterior surface 89a of flexible track 88 in that it is not populated with a plurality of lands or treads that define thin channels or grooves therebetween. Instead, the exterior surface 404 of flexible track 400 includes a plurality of panels 410 that are separated by lugs or bars 412. As shown, each panel 410 has a preferred width "W" of about 15 inches (38 cm), which is around the preferred width "W" of flexible track 88, 400, and a preferred length 414 of about 11-12 inches (27-31 cm). Each lug or bar 412 preferably extends transversely across the width of the track 400 from side to side, and has a preferred height 416 of about 1.45 inches (3.7 cm) and a base thickness 418 of about 1.50 inches (3.8 cm). With a flexible track 400 having an inner periphery or pitch length of around 166 inches (421 cm), there are preferably about ten panels 410 and ten lugs or bars 412 that are spaced evenly about the exterior surface 404 in an alternating fashion. The spacing 414 between the lugs or bars 412 is critical to the operation of the track assembly unit. It has been discovered that when the lugs or bars 412 are spaced relatively far apart the soil, upon which the track assembly traverses, does not become sheared off or broken away. This is important because when soil is sheared off or broken away, it becomes susceptible to wash-out. This wash-out or breaking away of the soil is minimized when the lugs or bars 412 are spaced apart from each other, and traction is optimized. Preferably, the panels and bars are arranged so that about 3-4 bars are always be in simultaneous contact with the ground over which it travels.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A track assembly suitable for use with a self-propelled irrigation vehicle having a plurality of tires, with each tire removably connectable to a wheel hub, the track assembly comprising:
   an adaptor comprising a body having a spindle, with the body configured and arranged to be attached to one of the wheel hubs;
   a carriage having a hub support frame with a spindle receiving aperture, a first wheel support frame and a second wheel support frame; a sprocket; and, a plurality of wheels; wherein the plurality of wheels are rotatably mounted to the first and second wheel support frames; wherein the sprocket is removably attached to the adaptor; wherein the spindle of the adaptor is rotatably mounted in the spindle receiving aperture of the hub support frame; and wherein a portion of one of the first or second wheel support frames is located directly beneath the sprocket; and
   an endless track having an inner surface and an outer surface, the track installed about the carriage so that an inner surface is able to contact the plurality of wheels and the sprocket, wherein the sprocket is able to drivingly engage the endless track.

2. The track assembly of claim 1, wherein the sprocket comprises a plurality of segments.

3. The track assembly of claim 1, wherein the sprocket is a split sprocket.

4. The track assembly of claim 1, wherein at least two of the plurality of wheels comprise idler wheels, with the idler wheels are located at opposite ends of the carriage and with the idler wheels defining a wheelbase, and wherein at least one of the idler wheels is adjustably positionable relative to the other idler wheel, whereby the length of the wheelbase may be varied.

5. The track assembly of claim 1, wherein the first wheel support frame and second wheel support frame are slidingly and adjustably movable relative to each other.

6. The track assembly of claim 1, wherein a portion of one of the first or second wheel support frames is telescopically received by a portion of the other of the first or second wheel support frames.

7. The track assembly of claim 1, wherein the carriage further comprises a tensioning apparatus that is operatively connected to the first wheel support frame and second wheel support frame, wherein the tensioning apparatus is configured and arranged to be able to urge the first and second wheel support frames away from each other along a general longitudinal axis of the carriage.

8. The track assembly of claim 7, wherein the tensioning apparatus is selected from the group consisting of a grease cylinder and a hydraulic cylinder.

9. The track assembly of claim 1, wherein the endless track includes at least one cleat having a ground engaging member with a working surface, wherein the cleat is able to be positioned over an outer transverse portion and opposing side edges of the endless track and removably attached thereto; wherein, in operation, the working surface of the cleat is able to project outwardly beyond the outer surface of the endless track.

10. The track assembly of claim 9, wherein the cleat includes a plurality of attachment members that are configured and arranged to contact the inner surface of the endless track when the cleat is operatively attached to the endless track.

11. The track assembly of claim 10, wherein one of the attachment members is configured to be removably connected to the cleat.

12. The track assembly of claim 1, wherein the first wheel support frame includes a top plate with an upper surface and opposing sides, the top plate forming a generally U-shaped recess, wherein one side of the U-shaped recess is substantially bounded by the hub support frame, wherein the other side of the U-shaped recess is substantially unbounded, wherein the unbounded side allows the sprocket to be installed or removed in a direction parallel to the rotational axis of the adaptor.

13. The track assembly of claim 1, wherein the body of the adaptor comprises a flange to which the sprocket segments may be removably secured.

14. The track assembly of claim 1, wherein the body of the adaptor comprises a ring extension that is configured and arranged to be attached to a wheel hub.

15. A self-propelled irrigation vehicle comprising:
a plurality of wheel hubs operatively connected to at least one motive source, with the wheel hubs operatively connected to a structure that supports a water conduit; and
a plurality of track assemblies, each track assembly including:
an adaptor having a body and a spindle, with the adaptor configured and arranged to be removably attached to one of the plurality of wheel hubs;
a carriage having a hub support frame with a spindle receiving aperture, a first wheel support frame and a second wheel support frame; a sprocket, and a plurality of wheels; wherein the plurality of wheels are rotatably mounted on the first and second wheel support frames; wherein the sprocket comprises a plurality of segments, each of which is removably attachable to the body of the adaptor; wherein the spindle of the adaptor is rotatably mounted in the spindle receiving aperture of the hub support frame; and wherein a portion of one of the first or second wheel support frames is located directly beneath the sprocket; and
a flexible, endless track installed about the carriage so that an inner surface of the endless track is able to contact the plurality of wheels and the sprocket, and wherein the sprocket drivingly engages the endless track.

16. The self-propelled irrigation vehicle of claim 15, wherein the sprocket comprises two arcuately-shaped segments.

17. The self-propelled irrigation vehicle of claim 15, wherein at least two of the plurality of wheels define a wheelbase, and wherein at least one of the plurality of wheels that define the wheelbase is adjustably positionable relative to the other of the plurality of wheels that define said wheelbase.

18. The self-propelled irrigation vehicle of claim 15, wherein the first wheel support frame and the second wheel support frame are slidingly and adjustably movable relative to each other.

19. The self-propelled irrigation vehicle of claim 15, wherein the carriage further comprises a tensioning apparatus that is operatively connected to the first wheel support frame and second wheel support frame, wherein the tensioning apparatus is configured and arranged to be able to urge the first and second wheel support frames away from each other along a general longitudinal axis of the carriage.

20. The self-propelled irrigation vehicle of claim 19, wherein the tensioning apparatus is selected from the group consisting of a grease cylinder and a hydraulic cylinder.

21. The self-propelled irrigation vehicle of claim 15, wherein the flexible, endless track includes at least one cleat having a ground engaging member with a working surface, wherein the cleat is able to be positioned on an outer transverse portion and around opposing side edges of the flexible, endless track and removably attached thereto; wherein, in operation, the working surface of the cleat is able to project outwardly beyond the outer surface of the flexible, endless track.

22. The self-propelled irrigation vehicle of claim 21, wherein the cleat includes a plurality of attachment members that are configured and arranged to contact the inner surface of the flexible, endless track when the cleat is attached to the flexible endless track.

23. The self-propelled irrigation vehicle of claim 21, wherein a section of the cleat is configured and arranged to be engagably received within a substantially transverse channel on the exterior surface of the flexible, endless track.

24. The self-propelled irrigation vehicle of claim 15, wherein the first wheel support frame includes a top plate forming a generally U-shaped recess, wherein one side of the U-shaped recess is substantially bounded by the hub support frame, wherein the other side of the U-shaped recess is substantially unbounded, wherein the unbounded side allows the sprocket to be installed or removed in a direction parallel to the rotational axis of the adaptor.

25. The self-propelled irrigation vehicle of claim 15, wherein the body of the adaptor comprises a flange to which the sprocket segments may be removably secured.

26. The self-propelled irrigation vehicle of claim 15, wherein there are two wheel hubs and the wheel hubs are operatively connected to at least one motive source.

27. A method of converting a self-propelled, tire supported irrigation vehicle to a self-propelled, track supported irrigation vehicle, the method comprising the steps of:
a.) providing a self-propelled irrigation vehicle having a plurality of powered hubs with each hub having a support tire removably connected thereto;
b.) providing a plurality of track assemblies, each track assembly including an adaptor comprising a body and a spindle, with the adaptor configured and arranged to be attached to one of the hubs of the irrigation vehicle, a carriage having a hub support frame with a spindle receiving aperture, a first wheel support frame and a second wheel support frame; a sprocket, with a portion of the sprocket located directly above one of the first or second wheel support frames, a plurality of bogey wheels and a plurality of idler wheels, with the plurality of idler and bogey wheels rotatably mounted on only the first and second wheel support frames; and an endless track having an inner surface and an outer surface, the endless track installed about the carriage so that the inner surface of the endless track is able to contact the plurality of bogey wheels, the plurality of idler wheels and the sprocket, and wherein the sprocket is able to drivingly engage the endless track;

c.) removing one of the plurality of support tires from the respective hub;
d.) securing the adaptor to the respective hub;
e.) attaching the sprocket to the adaptor;
f.) attaching the carriage to the spindle; and
g.) positioning the endless belt about the sprocket and wheels.

28. The method of claim 27, wherein steps e and f are reversed.

29. The method of claim 27, wherein the self-propelled irrigation vehicle provided includes two hubs, wherein the hubs are operatively connected to at least one motive source.

30. The method of claim 27, further comprising the steps of:

h.) providing at least one cleat comprising a ground engaging member and an attachment member; and
i.) removably attaching the cleat to the endless track such that the ground engaging member of the cleat extends outwardly from the outer surface of the endless track.

31. The method of claim 30, wherein the cleat includes a plurality of attachment members, wherein each attachment member contacts the inner surface of the endless track when the cleat is attached to the endless track.

32. The method of claim 31, wherein one of the attachment members is removably connectable to one end of the cleat, and wherein the step of removably attaching the cleat to the endless track includes the steps of:

i) disconnecting the attachment member from the cleat;
ii) positioning the cleat so that its ground engaging member is located on the outer surface of the endless track and one of the attachment members is located adjacent the inner surface of the endless track; and
iii) connecting the removable attachment member to the cleat such that the cleat secured to the endless track.

33. The track assembly of claim 1, wherein at least one of the first or second wheel support frames includes an upwardly extending end portion.

34. The self-propelled irrigation vehicle of claim 15, wherein at least one of the first or second wheel support frames includes an upwardly extending end portion.

35. A track assembly suitable for use with a self-propelled irrigation vehicle having a plurality of tires, with each tire removably connectable to a wheel hub, the track assembly comprising:

an adaptor comprising a body having a spindle, with the body configured and arranged to be attached to one of the wheel hubs;
a carriage having a hub support frame with a spindle receiving aperture, a first wheel support frame and a second wheel support frame; a segmented sprocket; a plurality of idler wheels, and at least one bogey wheel;
wherein a portion of one of the first or second wheel support frames is telescopically received by a portion of the other of the first or second wheel support frames and adjustable relative thereto;
wherein the plurality of idler and bogey wheels are rotatably mounted to the first and second wheel support frames;
wherein each segment of the sprocket is removably attachable to the adaptor;
wherein the spindle of the adaptor is rotatably mounted in the spindle receiving aperture of the hub support frame; and wherein a portion of one of the first or second wheel support frames is located directly beneath the sprocket; and
an endless track having an inner surface and an outer surface, the track installed about the carriage so that an inner surface is able to contact the plurality of wheels and the sprocket, wherein the sprocket is able to drivingly engage the endless track.

* * * * *